A. McFARLANE.
Dumping-Wagon.

No. 220,630. Patented Oct. 14, 1879.

WITNESSES:
C. Neveux
C. Sedgwick

INVENTOR:
A. McFarlane.
BY Munn & Co
ATTORNEYS.

UNITED STATES PATENT OFFICE.

ANNIE McFARLANE, OF SAN BERNARDINO, CALIFORNIA.

IMPROVEMENT IN DUMPING-WAGONS.

Specification forming part of Letters Patent No. 220,630, dated October 14, 1879; application filed May 8, 1879.

*To all whom it may concern:*

Be it known that I, ANNIE MCFARLANE, of San Bernardino, in the county of San Bernardino and State of California, have invented an Improved Dumping Cart or Barrow, of which the following is a specification.

Figure 1:
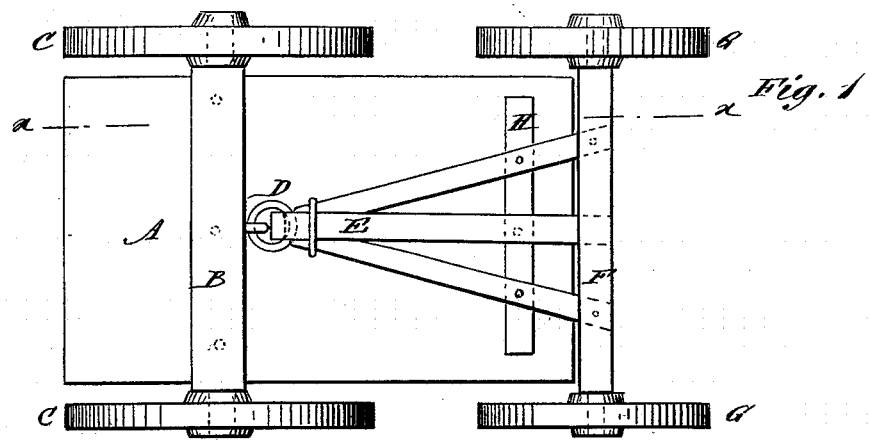
Figure 2:
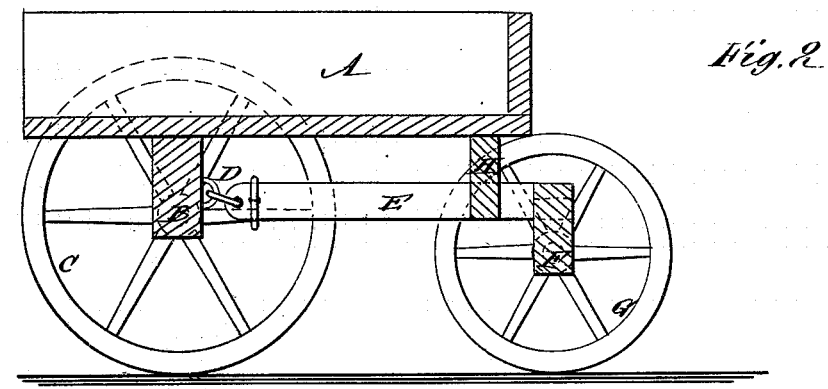
Figure 3:
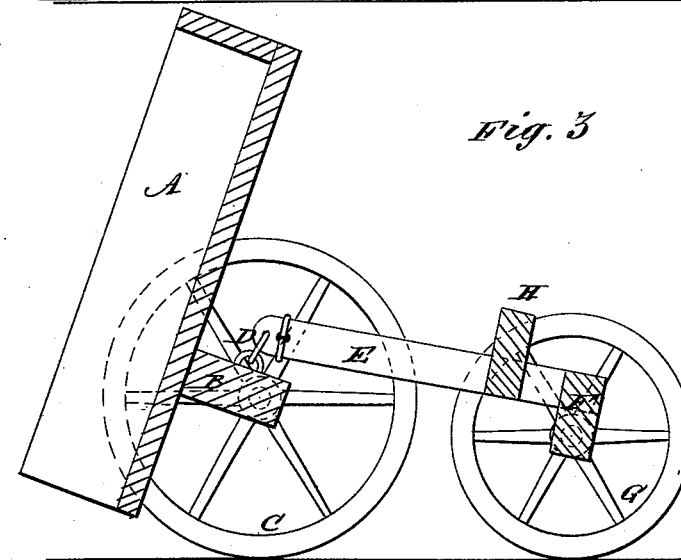

Figure 1 is a plan of the under side of the cart. Fig. 2 is a sectional elevation on line X X, Fig. 1. Fig. 3 is a sectional elevation, showing the position of the vehicle when dumping.

Similar letters of reference indicate corresponding parts.

The object of this invention is to provide a cheap, simple, and convenient dumping cart or barrow that will be especially serviceable in mines.

The invention consists of the body A, open at its front end and rigidly secured to the axle B of the front wheels C C, that are of greater diameter than the hind wheels.

Swinging from a central point of the front axle by ring and staple D, or other analogous device, is the triangular frame or reach E, to the rear and broad end of which is rigidly secured the axle F, that carries the two hind wheels C C.

When in an upright position the rear of the wagon-body rests level on the transverse beam H, that is bolted to the upper face of the reach. This arrangement of parts permits the turning of the cart upon short curves in the same manner as if it had but two wheels, while it at all times has the support of four.

The cart is to be propelled from behind and handles may be attached to it for this purpose; but in mines the handles will usually be dispensed with and the cart be pushed by hand. The cart can be easily dumped, and be turned to the right or left for this purpose, if desired, with perfect ease.

No particular form of construction of cart is claimed, it being designed only to illustrate in the drawings the construction and operation of a vehicle having the larger wheels in front and adapted to use as a dumping cart or barrow by rigidly attaching the body of the cart to the front axle and loosely attaching thereto the reach carrying the rear wheels.

Having thus described my invention, I claim as new and desire to secure by Letters Patent—

1. In the construction of a dumping barrow or cart, the body of the cart rigidly attached to the front axle, which carries the larger wheels, in combination with a pivoted or swinging reach, carrying the smaller hind wheels, that is attached to a central point of the front axle, substantially as herein shown and described.

2. The within-described dumping cart or barrow, consisting of the body A, axles B and F, wheels C C and G G, ring and staple D, reach E, and cross-beam H, substantially as herein shown, and for the purpose described.

ANNIE McFARLANE.

Witnesses:
VINTON L. MITCHELL,
C. H. CONDEE.